(12) United States Patent
Bondioli

(10) Patent No.: US 11,333,203 B2
(45) Date of Patent: May 17, 2022

(54) WIDE-ANGLE CONSTANT VELOCITY JOINT WITH LUBRICANT RESERVOIR

(71) Applicant: Edi Bondioli, Suzzara (IT)

(72) Inventor: Edi Bondioli, Suzzara (IT)

(*) Notice: Subject to any disclaimer, the term of this patent is extended or adjusted under 35 U.S.C. 154(b) by 302 days.

(21) Appl. No.: 16/597,576

(22) Filed: Oct. 9, 2019

(65) Prior Publication Data

US 2020/0132127 A1    Apr. 30, 2020

(30) Foreign Application Priority Data

Oct. 25, 2018    (IT) .................. 102018000009788

(51) Int. Cl.
  *F16D 3/32* (2006.01)
  *F16D 3/205* (2006.01)
  *F16N 9/02* (2006.01)
  *F16N 25/00* (2006.01)

(52) U.S. Cl.
  CPC ............. *F16D 3/2057* (2013.01); *F16D 3/32* (2013.01); *F16N 9/02* (2013.01); *F16N 25/00* (2013.01); *F16D 2300/06* (2013.01); *Y10S 464/905* (2013.01)

(58) Field of Classification Search
  CPC ...... F16D 3/2057; F16D 3/32; F16D 2300/06; F16N 25/00; F16N 9/02; Y10S 464/905
  USPC .................................................. 464/11, 118
  See application file for complete search history.

(56) References Cited

U.S. PATENT DOCUMENTS

| | | | |
|---|---|---|---|
| 4,650,439 A | 3/1987 | Mayhew | |
| 4,781,662 A | 11/1988 | Mayhew et al. | |
| 6,616,536 B2 * | 9/2003 | Herchenbach | F16D 3/32 464/118 |
| 7,033,278 B2 | 4/2006 | Bondioli | |
| 7,235,016 B2 * | 6/2007 | Fechter | F16D 3/36 464/118 |
| 2002/0010027 A1 | 1/2002 | Bondioli | |

FOREIGN PATENT DOCUMENTS

| | | |
|---|---|---|
| EP | 1 688 632 A2 | 8/2006 |
| EP | 2 158 410 B1 | 2/2015 |
| WO | 2008/151223 A1 | 12/2008 |

* cited by examiner

*Primary Examiner* — Greg Binda
(74) *Attorney, Agent, or Firm* — McGlew and Tuttle, P.C.

(57) ABSTRACT

The wide-angle constant velocity joint (100) includes: a central core (101) forming respective inner yokes (24, 25) for connection and in which there is housed a guide disc (11); and outer yokes (103, 105). The central core (101) forms a lubricant reservoir (1) in communication with an annular seat (7) in which the guide disc (11) is slidingly received.

21 Claims, 10 Drawing Sheets

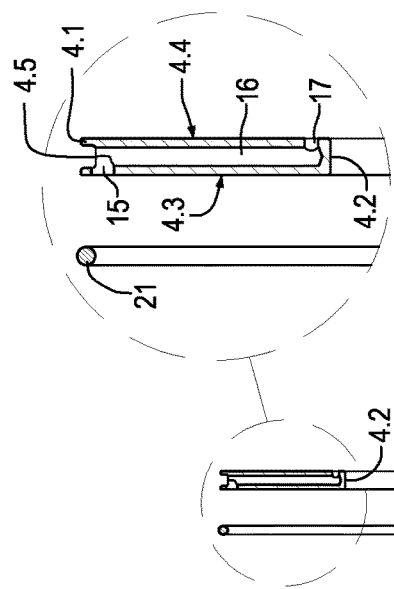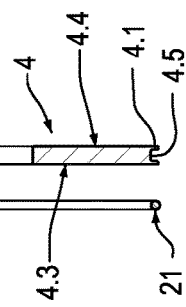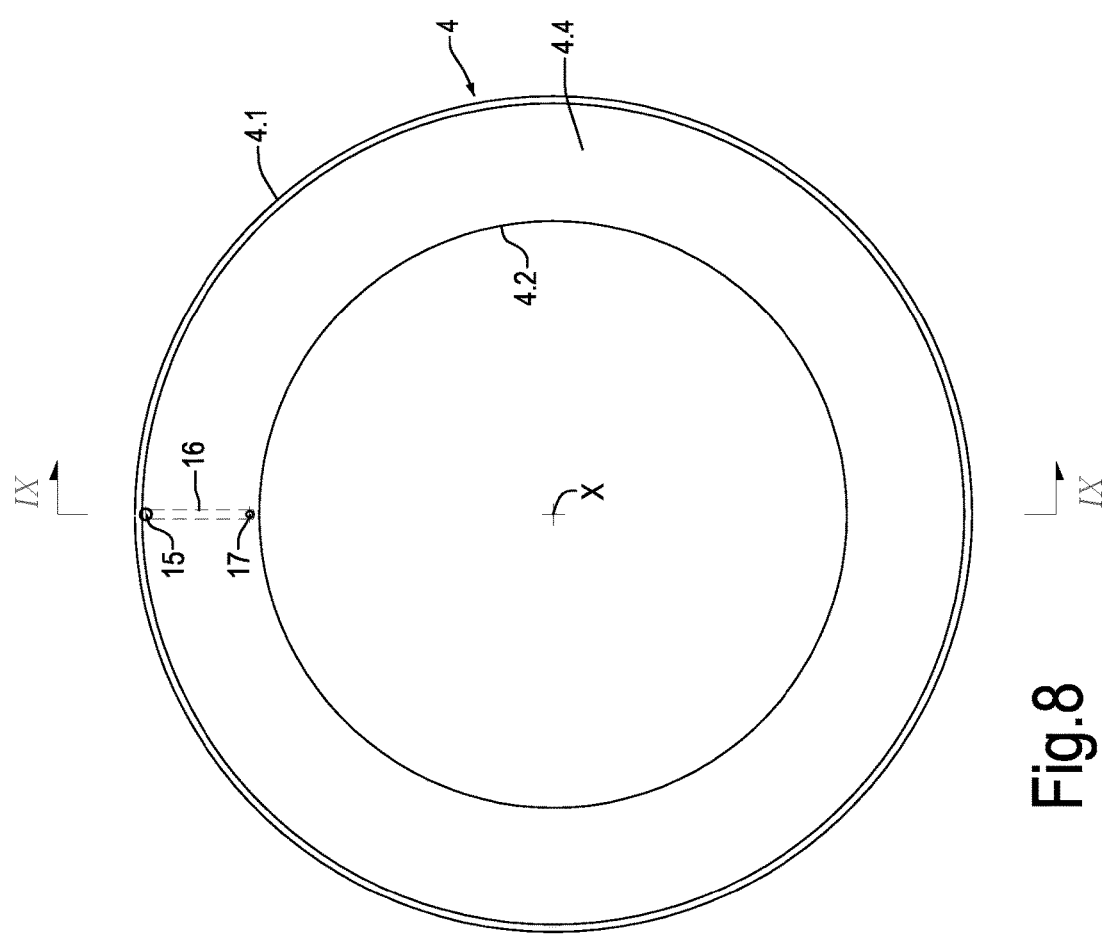
Fig.10
Fig.9
Fig.8

US 11,333,203 B2

WIDE-ANGLE CONSTANT VELOCITY JOINT WITH LUBRICANT RESERVOIR

TECHNICAL FIELD

The present invention relates to improvements to constant velocity joints. More in particular, the invention relates to improvements to wide-angle constant velocity joints.

BACKGROUND ART

Wide-angle constant velocity joints are frequently used in mechanical transmissions, where it may be necessary to allow wide tilt angles between drive shafts. Wide-angle constant velocity joints are extensively used, for example, in agricultural machinery.

Wide-angle constant velocity joints are disclosed for example in US2002/0010027 and in U.S. Pat. No. 7,033,278. These constant velocity joints have two lateral or outer yokes that engage, through two spiders, with two central or inner yokes, formed by a central core. The outer yokes are engaged, through spherical heads, with a guide element or disc, sometimes also called "satellite", which engages in an annular seat inside the central body. This arrangement allows the shafts connected by the joint to be arranged tilted in relation to each other, with the same angles that can even be in the order of several tens of degrees. Angles with these widths are useful to transmit motion from a power take-off of a tractor to an agricultural machine towed by the tractor.

Constant velocity joints of this type have considerable problems of lubrication. In fact, for correct operation of the joint the mutual sliding surfaces of the guide disc and of the annular seat in which it is housed, and the coupling surface between guide disc and spherical heads of the outer yokes, must be constantly lubricated. For this purpose, the annular seat that slidingly houses the guide disc is filled with lubricating grease. The unavoidable losses due to leakage of the lubricant require routinely lubricant top-up through a grease nipple, in direct fluid communication with the annular seat in which the guide disc is housed. Typically, lubrication is repeated approximately every 50 hours of operation of the constant velocity joint. Operations to top up or refill the lubricant require the machines to which the joint is connected to be switched off.

WO2008/151223 discloses a universal constant-velocity joint with improved lubrication. The central core of the joint comprises a central core connected to respective outer yokes by means of two spiders. The outer yokes have spherical protrusions engaging a guide disc, slidingly housed in a seat formed in the central hole. The seat extends radially outwardly thus forming an annular lubrication grease reservoir, which represents radial extension of the seat. The amount of lubricant grease available is increased, but the lubrication conditions are unsatisfactory.

Therefore, a need to improve constant velocity joints exists, in particular wide-angle constant velocity joints, in order to reduce or alleviate the problems of joints of the current art, in particular problems linked to their lubrication.

SUMMARY OF THE INVENTION

To obtain better lubrication, a wide-angle constant velocity joint is provided, in which inside the central core, which forms the inner yokes and in which there is housed the guide disc constrained to the outer yokes of the joint, a lubricant reservoir is provided, in communication with the annular seat in which the guide disc is slidingly received.

With an arrangement of this type it is possible to fill the reservoir with a reserve of lubricant, for example a lubricating grease. During operation of the joint, the lubricant is gradually dispensed from the reservoir toward the sliding seat of the guide disc. The lubricant that leaks toward the outside of the joint is replaced continuously by lubricant coming from the reservoir. The supply of lubricant in the reservoir allows the joint to operate for a considerable number of hours without requiring operations to top up the lubricant in the joint.

It has been found that with a reservoir with dimensions that do not negatively influence the weight and overall dimensions of the joint, it is possible to reach intervals between one lubricant filling and the next up to and over ten times longer than the intervals at which it is currently necessary to top up with lubricant the sliding seat of the guide disc of the wide-angle constant velocity joints of the current art.

In advantageous embodiments, the central core can comprise a first body and a second body, coupled to one another, which form the two inner yokes of the joint and between which the annular seat is defined, in which the guide disc is received and slides. The lubricant reservoir can be formed in one of the two bodies of the central core. Advantageously, the two bodies can be reversibly coupled to each other, for example by bolts, to facilitate maintenance operations and repairs.

To optimize the capacity of the reservoir, in advantageous embodiments the reservoir has an annular extension around the rotation axis of the central core and is preferably positioned on one side of the annular seat, in which the guide disc or satellite is housed.

To obtain smooth and prolonged operation of the joint, joint comprises a dosing system to dose the lubricant from the reservoir to the annular seat and toward the sliding surfaces of the spherical heads of the outer yokes on the guide disc. In this way, consumption of lubricant is reduced to a minimum and made regular in time. The dosing system can be configured to dose the lubricant as a result of the centrifugal force generated by rotation of the joint on the lubricant contained in the reservoir.

In some embodiments, the dosing system comprises a dosing disc interposed between the reservoir and the annular seat. For example, the dosing disc can comprise: an inlet hole, an outlet hole and a slot extending radially in the thickness of the dosing disc and that places the inlet hole in communication with the outlet hole. Advantageously, the inlet hole and the outlet hole are not aligned with each other, but are spaced from each other in tangential direction and/or in radial direction. In this way, a lubricant dispensing path is defined along the slot from the inlet hole to the outlet hole. The dimension of the holes, their mutual position and the dimension of the slot are parameters that can be dimensioned to obtain the desired lubricant flow rate, if necessary taking account of the radial dimension of the joint and/or of the steady-state angular velocity, factors that influence the centrifugal force that acts on the lubricant during operation of the joint.

To fill the reservoir with lubricant, in some embodiments a grease nipple can be provided. To allow complete filling of the reservoir, a valve can be provided, adapted to allow lubricant to exit from the reservoir when the reservoir is full. In this way, the operator can feed pressurized lubricant into the reservoir until it is completely filled, which is visually detected through the lubricant exiting from the valve.

In advantageous embodiments, the lubricant reservoir is divided into a storage chamber and a feed chamber. The storage chamber is in communication with the feed chamber and the feed chamber is in communication with the annular seat of the central core in which the satellite or guide disc is slidingly housed. The aforesaid dosing disc is placed between the feed chamber and the annular seat, while between the feed chamber and the storage chamber a feed disc is placed, configured to maintain a substantially constant level of lubricant in the feed chamber gradually transferring lubricant from the storage chamber to the feed chamber.

The feed disc can comprise: an inlet hole, in communication with the storage chamber; an outlet hole, in communication with the feed chamber; and a connection channel, formed in the thickness of the feed disc and extending radially between the inlet hole and the outlet hole. The inlet hole is at a greater distance than the outlet hole with respect to the rotation axis of the core. Through the centrifugal force the lubricant passes from the storage chamber to the feed chamber, from where it is dispensed in a dosed manner toward the annular seat of the core, in which the guide disc is housed.

The reservoir can advantageously comprise a calibrated hole in communication with the outside environment. The dimension of the hole is such to reduce or prevent the passage of lubricant from the inside of the reservoir toward the outside, but to allow the passage of air. In this way, as the lubricant exits from the reservoir and is dispensed into the annular seat, in which the guide disc is housed, outside air fills the reservoir, maintaining the ambient pressure therein and thus allowing regular outflow of the lubricant The guide disc can have one or more radial holes, which extend in the thickness of the guide disc, from a radially outer edge to an axial central seat of the guide disc, in which spherical heads of the first outer yoke and of the second outer yoke engage. The lubricant penetrates the radial holes, and hence the axial central seat, as a result of the movement in radial direction of the guide disc in the annular seat.

In advantageous embodiments, at least one of the spherical heads of the outer yokes is passed through by a hole that places the inside of the guide disc, and more in particular its axial central seat in which the spherical heads of the yokes engage, in communication with the outside environment. In this way, the correct pressure is maintained at all times in the volume delimited between the two spheres, ensuring correct lubrication.

To improve the seal and reduce leakages of lubricant, between the guide disc and the annular seat, in which it is slidingly received, there can be arranged annular laminar bodies in sliding contact each with a respective substantially flat surface of the guide disc and a respective substantially flat surface of the annular seat. In advantageous embodiments, the annular laminar bodies are preferably elastic and take, at rest, a conical shape, like a Belleville washer. When mounted the annular bodies are deformed in a substantially planar configuration. In this way, a pressure is generated on the contact surfaces of the annular laminar bodies, to increase the seal on the guide disc and reduce leakages of lubricant.

To further improve the seal, in some embodiments between each face of each elastic annular laminar body and the corresponding surface of the guide disc and the corresponding surface of the annular seat, respective annular sealing gaskets, preferably in the form of O-rings are arranged.

BRIEF DESCRIPTION OF THE DRAWINGS

The invention will be better understood by following the description and the accompanying drawings, which illustrate an exemplary and non-limiting embodiment of the invention. More particularly, in the drawings:

FIG. 8 is a front view of the feed disc;

FIG. 9 is a section according to IX-IX of FIG. 8;

FIG. 10 is an enlargement of a portion of FIG. 9;

DETAILED DESCRIPTION OF AN EMBODIMENT

Figure 1:
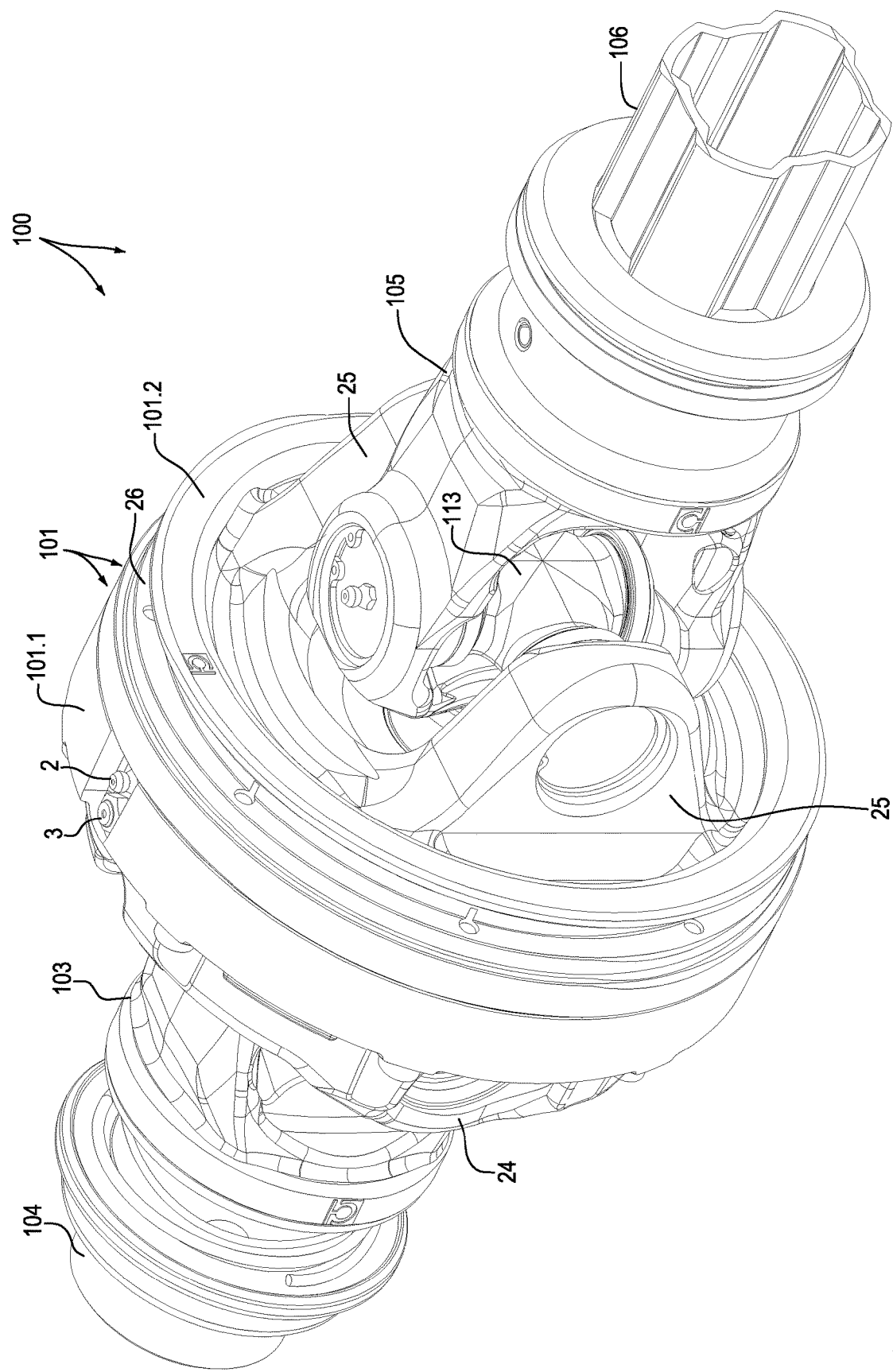
FIGS. 1 and 2 are isometric views according to two different angles of the constant velocity joint in an embodiment, from which the guard has been removed.
Figure 2:
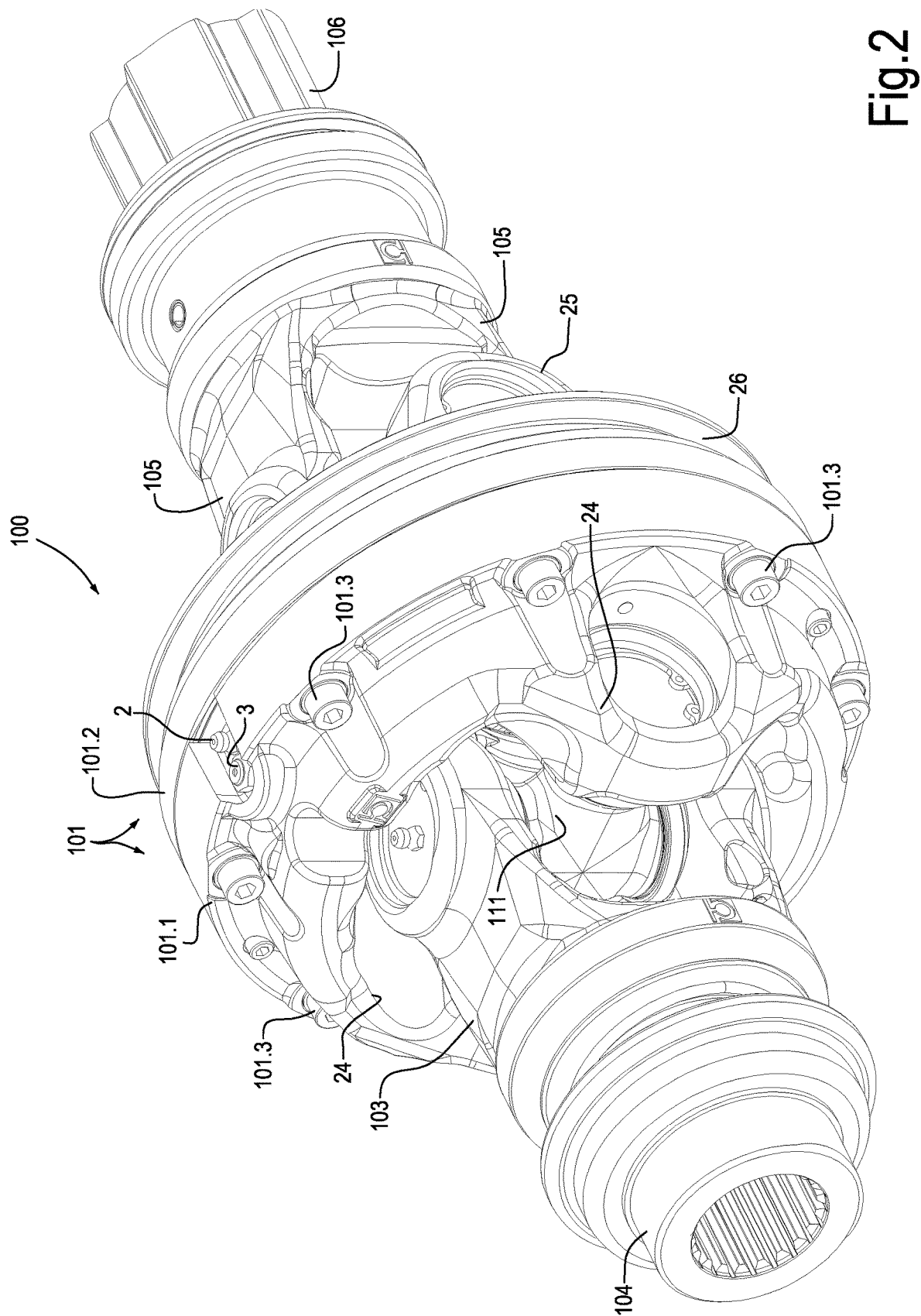

FIGS. 1 and 2 show a wide-angle constant velocity joint 100 in isometric views from two different angles. The joint 100 comprises a central core 101, to which there are connected, in the manner described below, two yokes 103, 105, hereinafter called first outer yoke 103 and second outer yoke 105, to distinguish them from respective inner yokes formed by the core 101 described below.

The first outer yoke 103 is connected to a grooved profile 104 for coupling to a first shaft (not shown) and the second outer yoke 105 is connected to a second grooved profile 106 for coupling to a second shaft (not shown). One of the two shafts couplable to the joint 100 is a drive shaft, for example a shaft that receives power from a power take-off of a tractor; the other shaft is a driven shaft, for example a shaft of an agricultural machine coupled to the tractor.

As can be seen in particular in the sections shown in FIGS. 3, 4, 5 and 6, the central core 101 is formed by two portions or bodies 101.1 and 101.2 coupled to each other. In the illustrated embodiment, the coupling between the bodies 101.1 and 101.2 is a reversible coupling obtained by means of screws 101.3. This allows disassembly of the constant velocity joint 100 for repairs or maintenance operations. In other less advantageous embodiments, the two bodies 101.1 and 101.2 can be joined to each other permanently, for example by welding.

The body 101.1 forms a first inner yoke 24 and the body 101.2 forms a second inner yoke 25. The first outer yoke 103 is joined to the first inner yoke 24 through a first spider 111. The second outer yoke 105 is joined to the second inner yoke 25 though a second spider 113.

As can be seen in particular in FIGS. 3, 4, 5 and 6, in the first body 101.1 of the central core 101 a lubricant reservoir 1 is formed, the purpose of which is to contain a supply of lubricant, for example a lubricating grease, which is dispensed gradually during rotation of the constant velocity joint 100, in the manner described in detail below.

In advantageous embodiments, the portion or body 101.1, in which the reservoir 1 is provided, can be made of aluminum or another light material. In this way, notwithstanding its larger dimension with respect to normal constant velocity joints (due to the need to house the reservoir 1) the total weight of the constant velocity joint 100 does not increase excessively.

The lubricant reservoir 1 has a substantially annular shape and extends around the axis X of rotation of the central core 101 of the constant velocity joint 100. The reservoir 1 can be filled through a grease nipple 2. To verify complete filling of the reservoir 1 with lubricant, in advantageous embodiments a valve 3 can be provided, from which lubricant exits when the lubricant reservoir 1 is completely full. A calibrated hole 13, visible in particular in FIGS. 3, 4 and 5, allows air to be vented from the lubricant reservoir 1 during its filling with lubricant.

In the illustrated embodiment, the lubricant reservoir 1 is divided into two parts by a feed disc 4. More in particular, the feed disc 4 divides the lubricant reservoir 1 into: an actual reservoir, hereinafter indicated as storage chamber 1.1; and a feed chamber 5. As will be explained below, in particularly advantageous embodiments there is provided a dosing system that ensures that lubricant is transferred gradually from the storage chamber 1.1 to the feed chamber 5, where the level of lubricant remains substantially approximately constant, as lubricant is dispensed to the moving parts of the constant velocity joint 100. The level of lubricant in the feed chamber 5 is maintained as a result of the gradual transfer of lubricant from the storage chamber 1.1 to the feed chamber 5 and consequent gradual reduction of lubricant in the storage chamber 1.1.

In the illustrated embodiment, the feed chamber 5 is closed (on the opposite side with respect to the storage chamber 1.1) by a dosing disc 6, which separates the feed chamber 5 from an annular seat 7 provided in the central part of the core 101. The reservoir 1 is therefore positioned at the side of the annular seat 7. The dosing disc 6 is part, together with the feed disc 4, of the dosing system associated with the reservoir 1.

Figure 3:
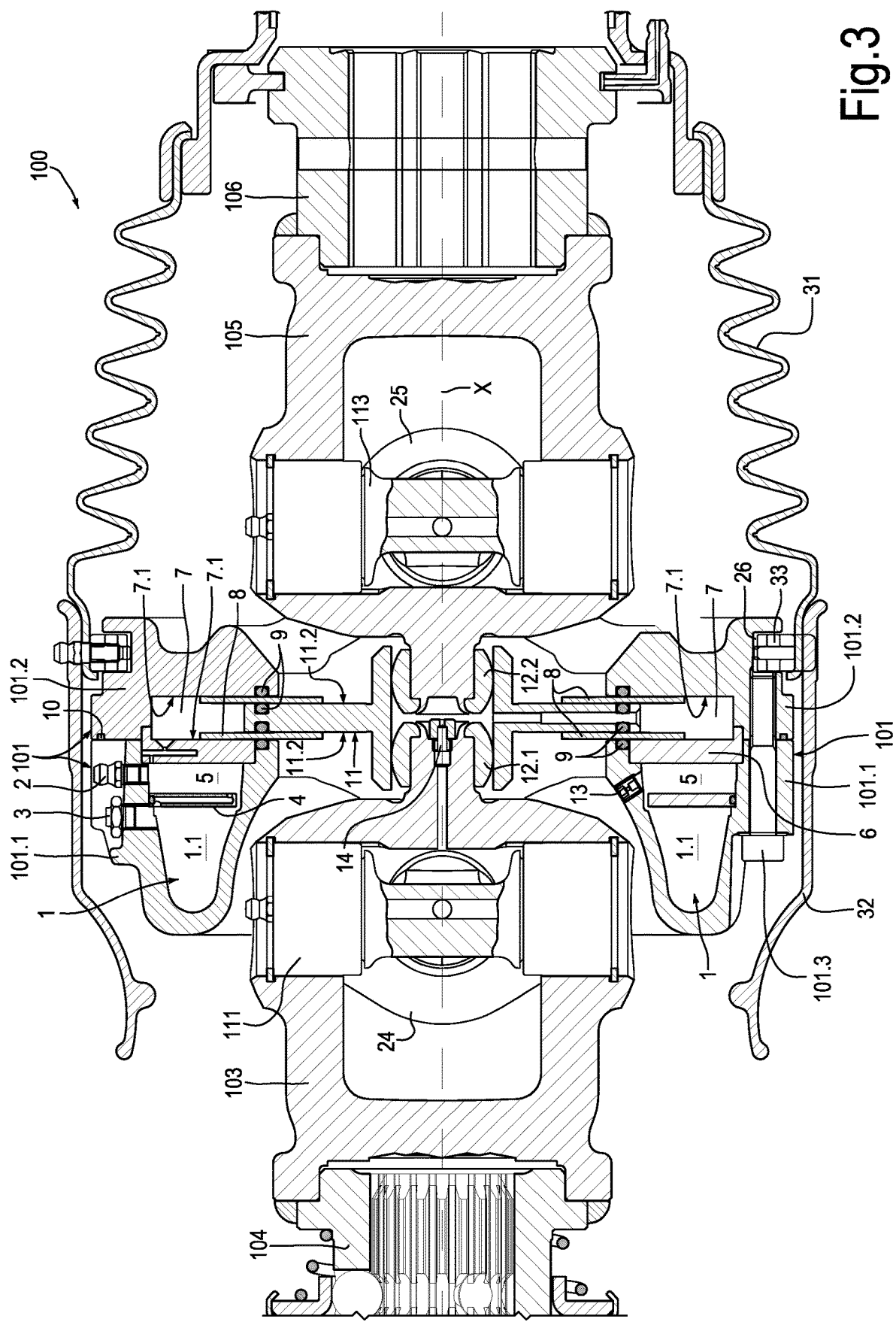
FIGS. 3 and 4 are sections of the constant velocity joint of FIGS. 1 and 2 according to a plane containing the axes of the shafts connected by the joint, in two different angular positions.
Figure 4:
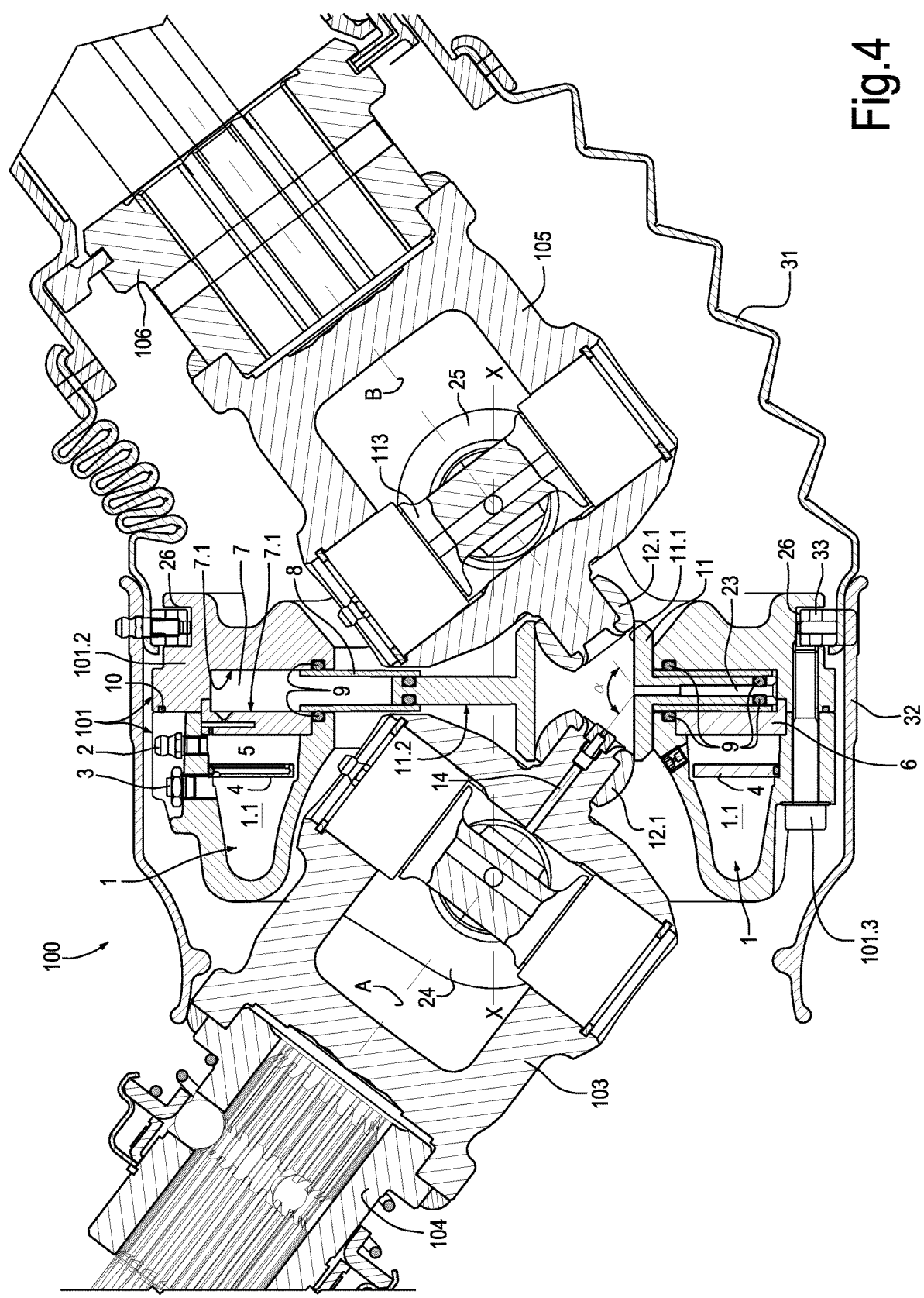
Figure 5:
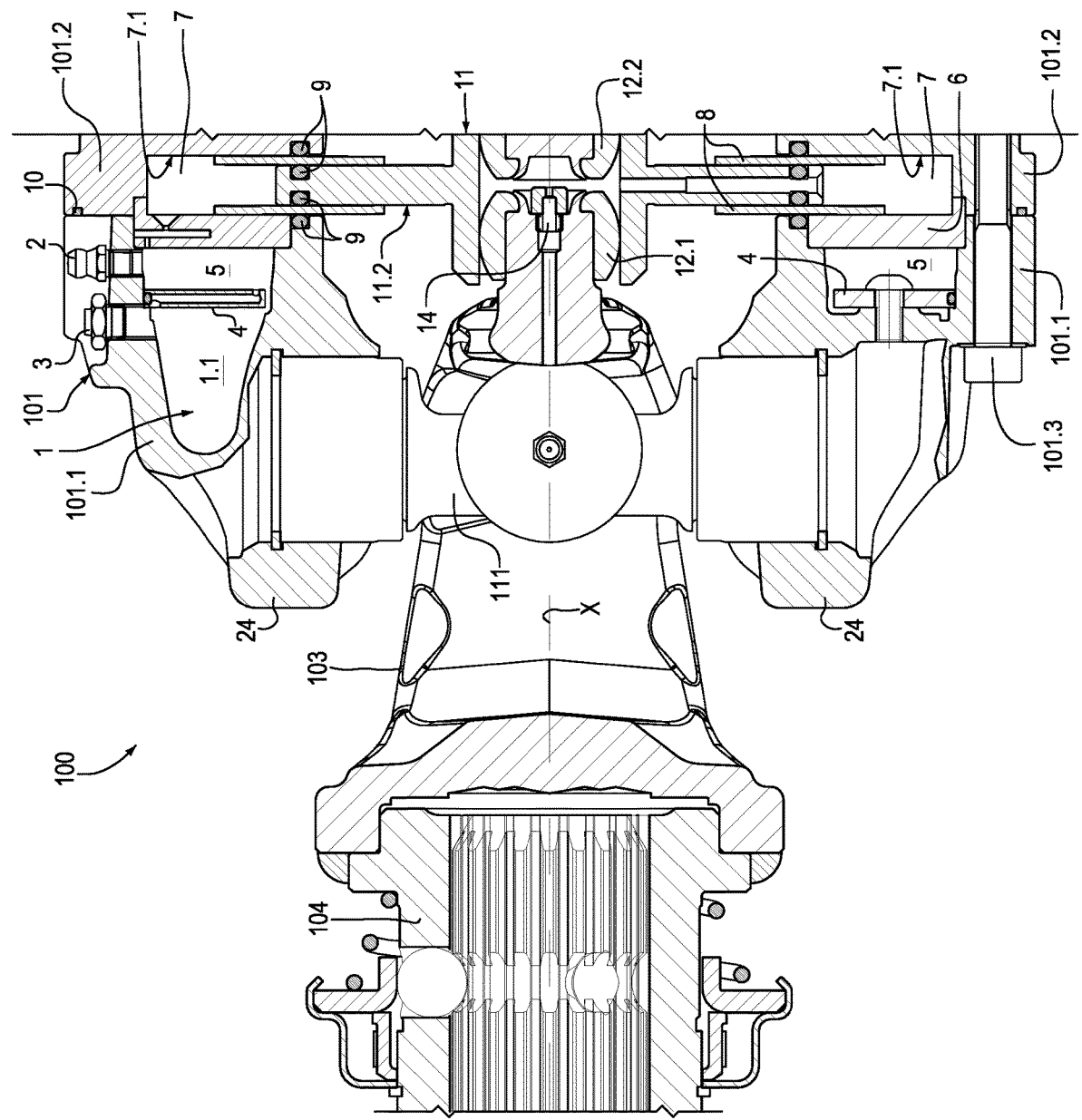
FIG. 5 is a partial section of the constant velocity joint according to a plane with a section rotated through 90° with respect to the plane of the section of FIG. 3.
Figure 6:
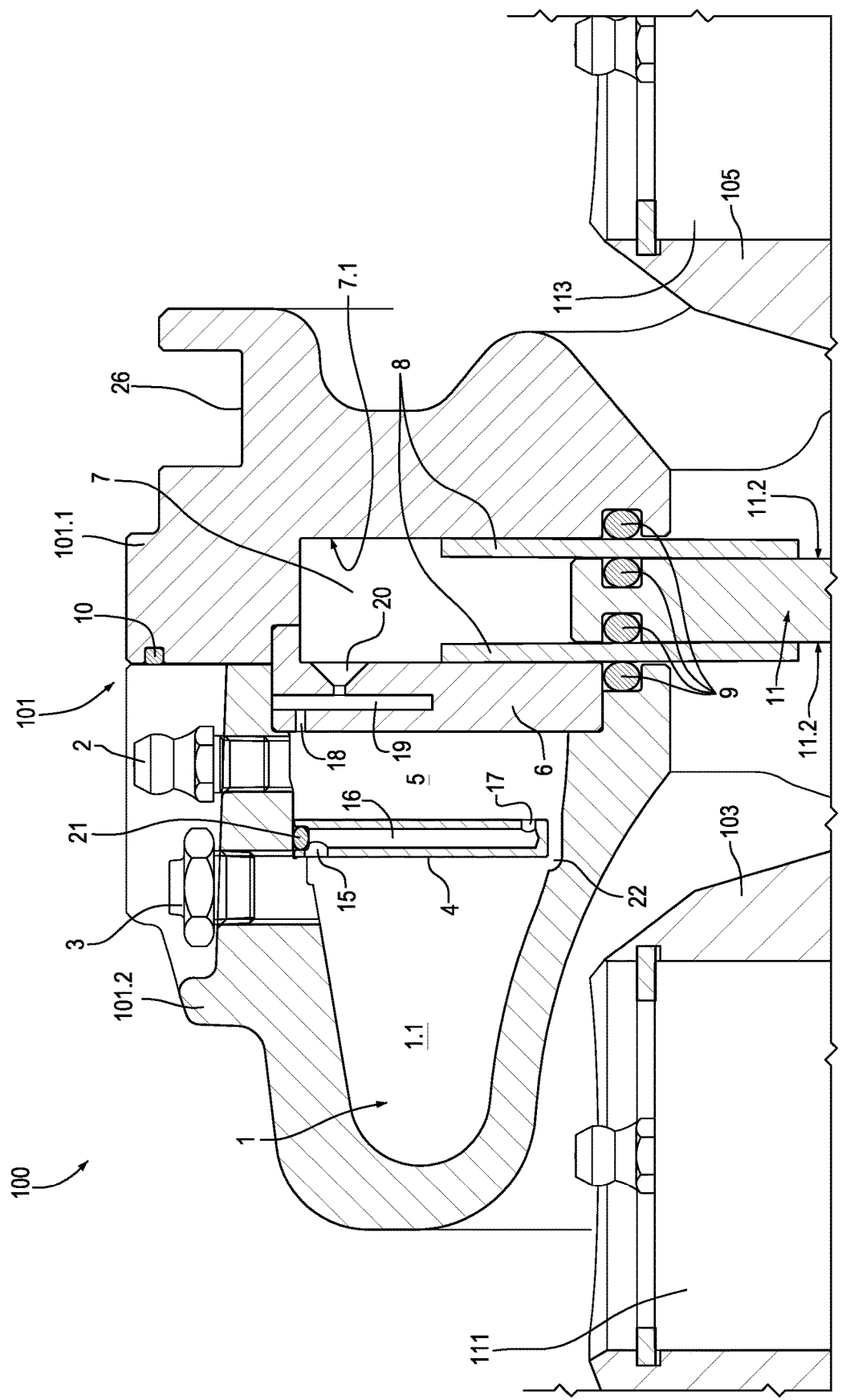
FIG. 6 is an enlargement of the section of FIG. 3.
Figure 7:
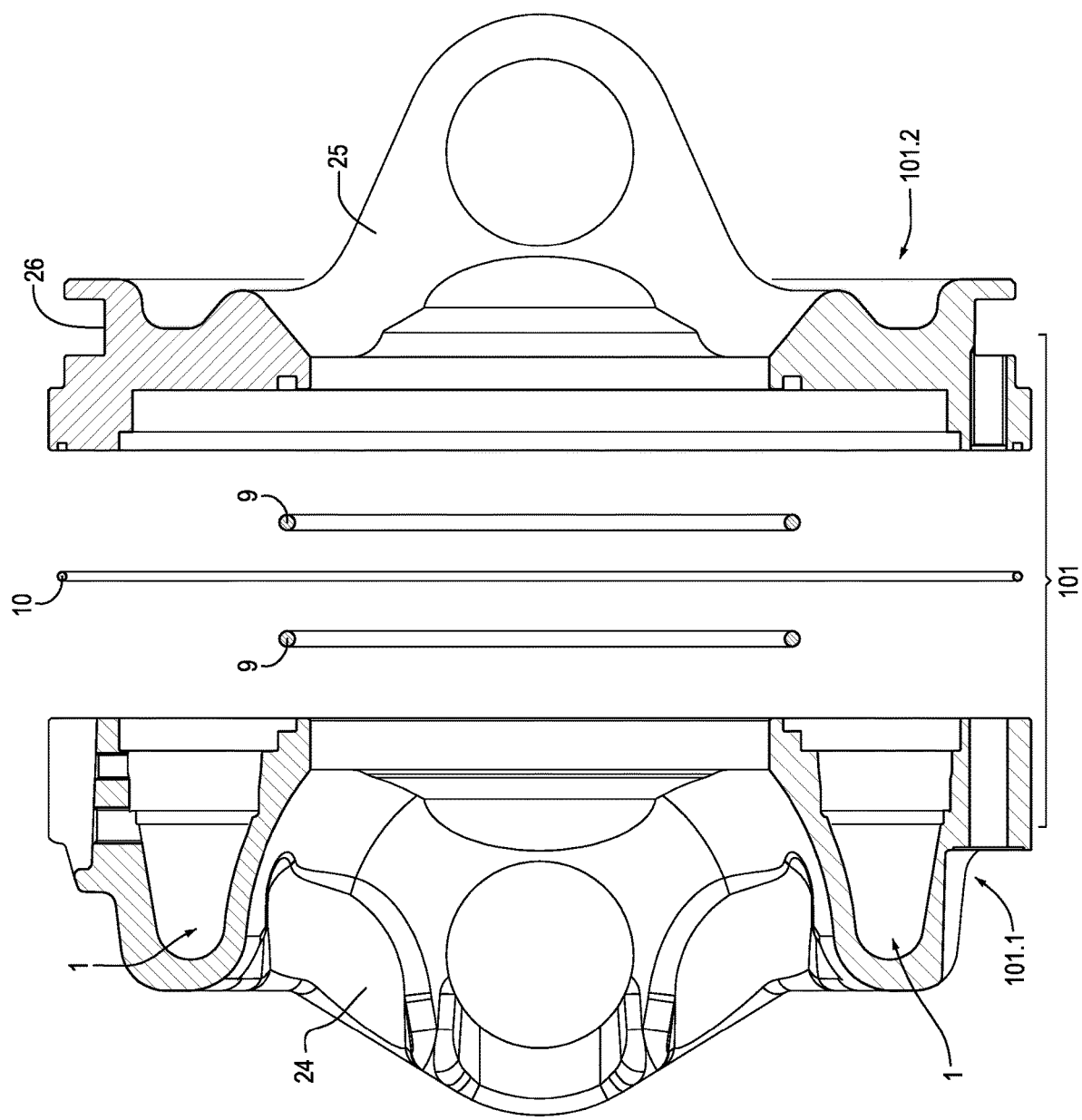
FIG. 7 is a sectional exploded view of the portions that form the core and the inner yokes of the constant velocity joint.

In the annular seat 7 a guide disc is housed, also called "satellite", labelled with 11. The guide disc 11 is movable in the annular seat 7 and can take different positions as a function of the angle formed by the shafts connected by the constant velocity joint 100. FIGS. 3 and 4 show, by way of example:

FIG. 3 a first position, in which the grooved profiles 104, 106 are coaxial and therefore the shafts (not shown) connected by the constant velocity joint 100 are aligned. In this position the guide disc 11 is coaxial to the grooved profiles 104, 106, to the yokes 24, 25, 103, 104 and to the central core 101. All the aforesaid components are aligned on the rotation axis X of the constant velocity joint 100;

FIG. 4 a second position, in which the grooved profiles 104, 106 (and therefore the respective shafts, not shown), form an angle α (angle between the axes A and B of the grooved profiles 104, 106 and of the outer yokes 103, 105). In this position, which represents the minimum angle that can be reached between the shafts connected to the constant velocity joint 100, the guide disc 11 is moved to the peripheral zone of the annular seat 7.

The guide disc 11 comprises an axial central seat 11.1, of substantially cylindrical shape, in which spherical heads 12.1 and 12.2 integral with the first outer yoke 103 and with the second outer yoke 105, respectively, engage. As a result of this connection, the guide disc 11 moves in the annular seat 7 when the angle between the two axes A and B of the grooved profiles 103 and 106, and hence of the shafts joined by the constant velocity joint 100, varies. The spherical heads 12.1, 12.2 are in sliding contact with the cylindrical surface of the axial central seat 11.1 of the guide disc or satellite 11. The purpose of the lubricant contained in the reservoir 1 is, in particular, to lubricate the contact surfaces between spherical heads 12.1, 12.2 and axial central seat 11.1.

Between the guide disc 11 and lateral surfaces 7.1 of the annular seat 7 there are arranged elastic annular bodies 8 in contact with the surfaces 7.1 of the annular seat 7 and with the lateral surfaces 11.2 of the guide disc 11. In advantageous embodiments the elastic annular bodies 8 can be formed by Belleville washers which, when mounted, are deformed until they take the flat configuration illustrated in the accompanying figures. In this way, the elastic deformation to which the Belleville washers 8 are subject generates a contact force of the Belleville washers 8 with the surfaces 11.2 and 7.1, which allows an effective seal to be achieved between the annular seat 7, which contains lubricant from the reservoir 1, and the outside of the constant velocity joint 100.

To further improve the seal, annular grooves for auxiliary gaskets, indicated with 9, can be provided on the surfaces 7.1 and 11.2. In the case in which, as in the example illustrated, the two bodies 101.1 and 101.2 of the central core 101 are reversibly connected to each other, a further gasket 10 can be provided between said two bodies 101.1 and 101.2.

FIGS. 6, 8, 9 and 10 show in detail the features of the feed disc 4. In particular, FIG. 8 shows the feed disc 4 isolated and in a front view, i.e., parallel to the rotation axis X of the central core 101; FIG. 9 shows a section according to a diametral plane along the line IX-IX in FIG. 8, and FIG. 10 shows an enlargement of a detail of FIG. 9.

The feed disc 4 comprises a radially outer edge 4.1, a radially inner edge 4.2, a first face 4.3 facing the storage chamber 1.1 of the reservoir 1 and a second face 4.4 facing the feed chamber 5. On the face 4.3 of the feed disc 4 there is provided an inlet hole 15, which communicates with a radial channel 16, provided in the thickness of the feed disc 4. The radial channel 16 extends from the inlet hole 15 to an outlet hole 17 on the face 4.4 of the feed disc 4. The inlet and outlet holes 15, 17 and the channel 16 form a path for the lubricant from the storage chamber 1.1 of the reservoir 1 to the feed chamber 5, in which the inlet hole 15 is radially more distant from the axis X with respect to the outlet hole 17.

Along the radially outer edge 4.1 of the feed disc 4 there can advantageously be provided an annular groove 4.5 for a gasket 21, for example an O-ring, so as to avoid leakage of lubricant from the storage chamber 1.1 of the reservoir 1 toward the feed chamber 5. Vice versa, along the radially inner edge 4.2 an opening is provided, preferably an annular opening, which places the storage chamber 1.1 of the reservoir 1 in communication with the feed chamber 5, for the purposes that will be explained below. The opening or passage defined along the edge 4.2 of the feed disc 4 is indicated with 22 in FIG. 6.

Figure 13:
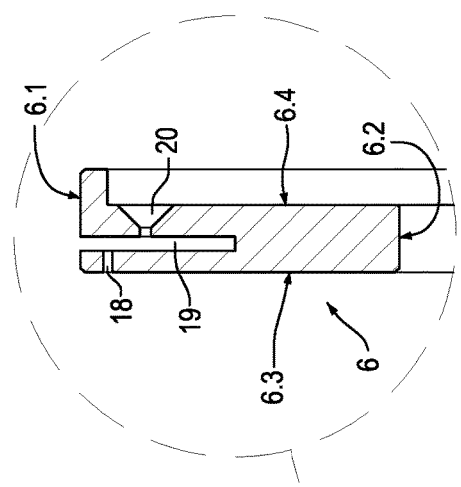
FIG. 13 is an enlargement of a portion of FIG. 12.
Figure 12:
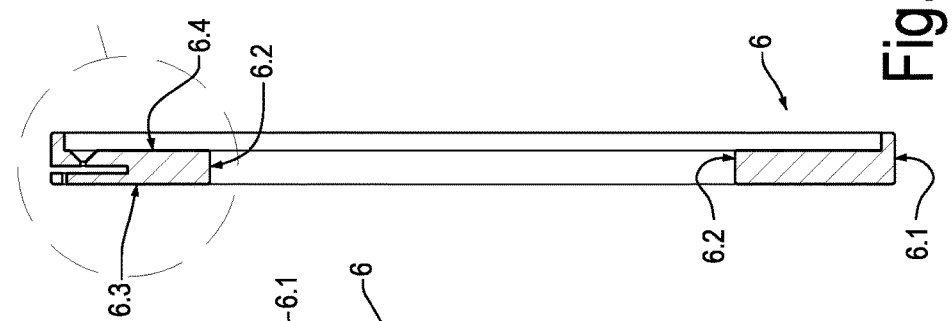
FIG. 12 is a section according to XII-XII of FIG. 11.
Figure 11:
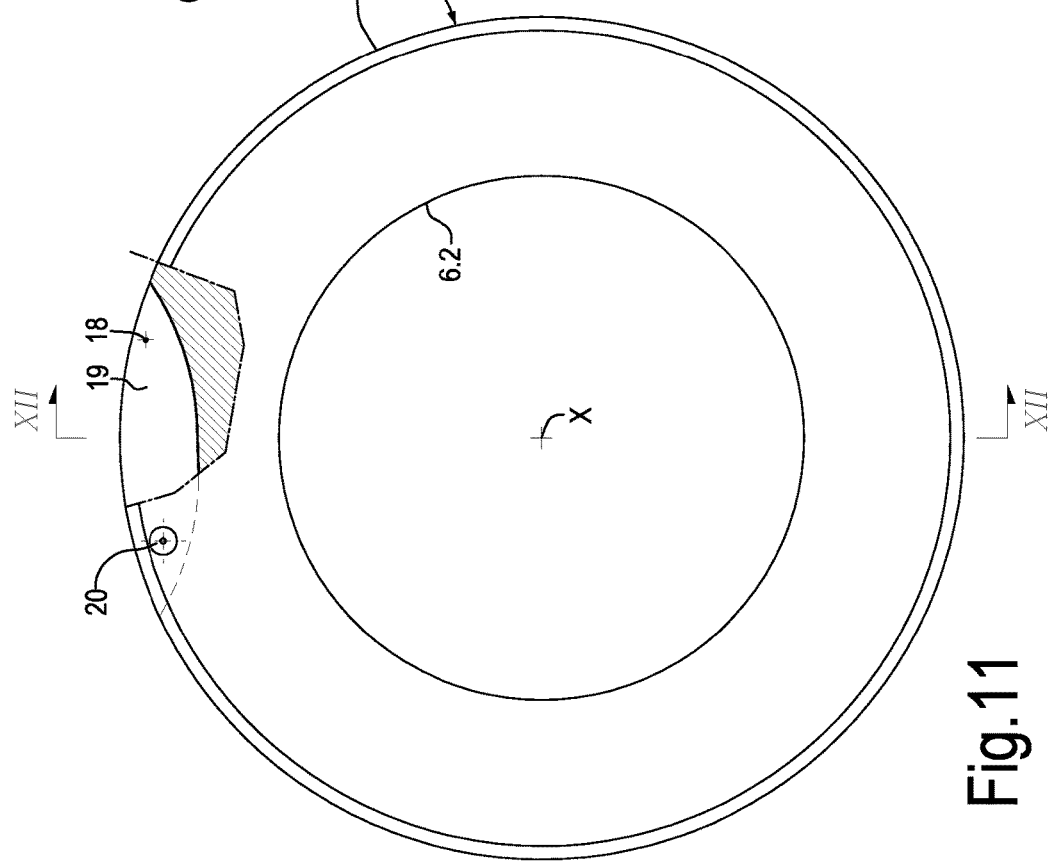
FIG. 11 is a front view and partial section of the dosing disc.

FIGS. 6, 11, 12 and 13 illustrate in detail the features of the dosing disc 6. FIG. 11 shows a front view of the dosing disc 6, according to the direction of the axis X of rotation of the central core 101 with a portion sectioned along a plane orthogonal to the axis X. FIG. 12 shows a section according to a diametral plane and FIG. 13 shows an enlarged detail of FIG. 12.

The dosing disc 6 comprises a radially outer edge 6.1 and a radially inner edge 6.2. The reference numerals 6.3 and 6.4 respectively indicate the face of the dosing disc 6 facing the feed chamber 5 and the face facing the annular seat 7, in which the guide disc or satellite 11 is slidingly housed. An inlet hole 18 is formed on the face 6.3 of the dosing disc 6 and is in communication, through a slot 19 provided in the thickness of the dosing disc 6, with an outlet hole 20 formed on the face 6.4. The term slot means in general a narrow opening that places the inlet hole 18 in communication with the outlet hole 20 of a dimension and/or shape that causes a drop in pressure on the lubricant. The inlet and outlet holes 18, 20 can be at slightly different radial distances with respect to the axis X and more precisely, as is visible in FIG. 13, the hole 20 is closer to the axis X than the hole 18. Although in FIGS. 12 and 13 the two holes 18 and 20 are represented on the same plane of the figure, in actual fact they are angularly staggered, i.e., they are in two angularly spaced positions, as is visible in FIG. 11. In this way, there is a distance in tangential direction, i.e. around the axis X, between the two holes 18 and 20, for the purposes that will be explained below.

In advantageous embodiments, the outlet hole 20 is flared, so that its diameter on the face 6.4 is greater with than the diameter at the slot 19. This prevents the risk of clogging of the hole on the sliding surface of the elastic annular bodies 8.

Figure 16:
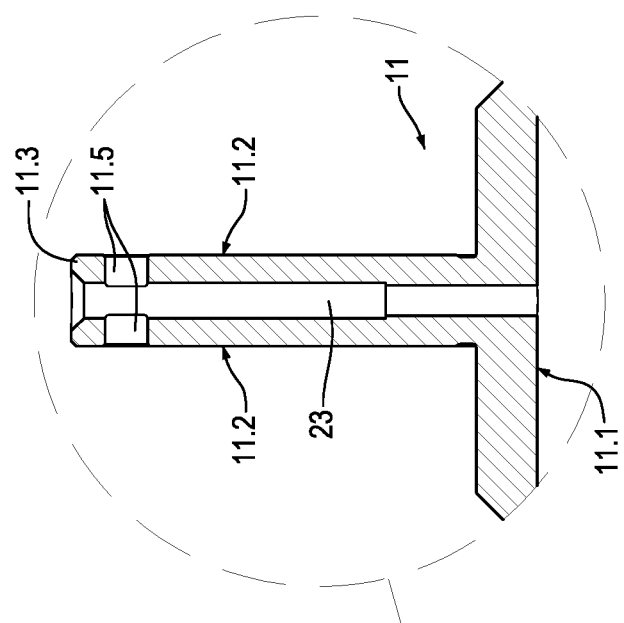
FIG. 16 is an enlargement of a portion of FIG. 15.
Figure 15:
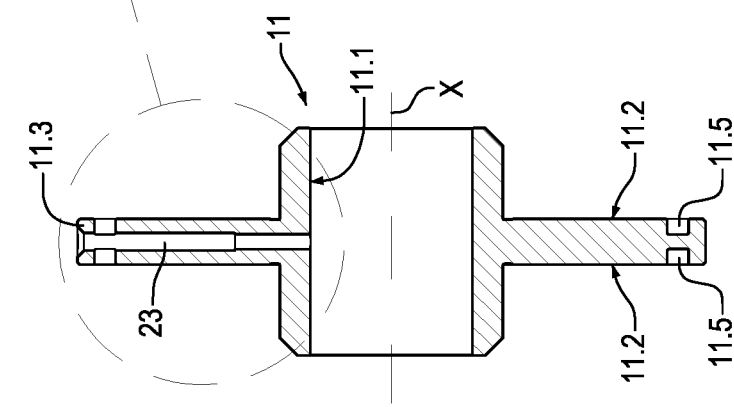
FIG. 15 is a section according to XV-XV of FIG. 14.
Figure 14:
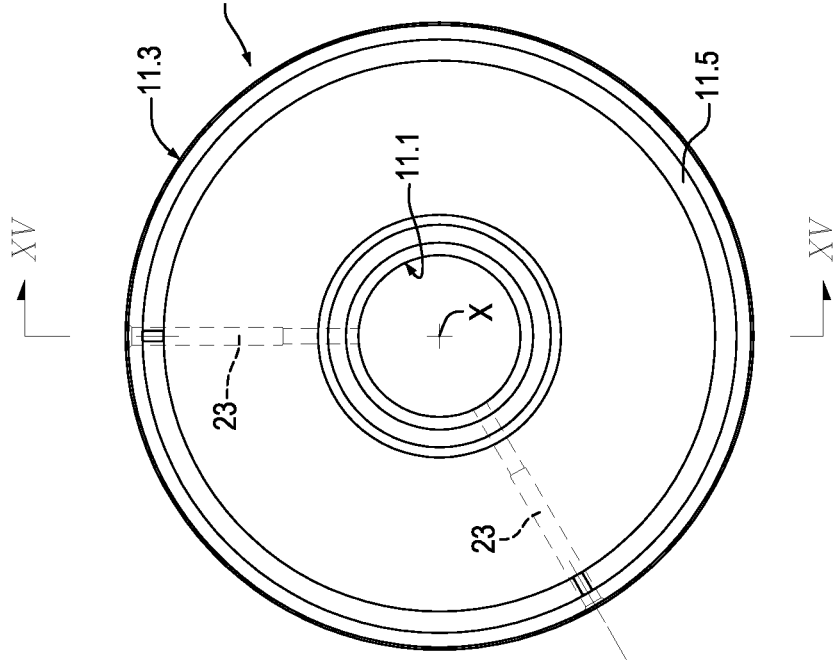
FIG. 14 is a front view of the guide disc.

FIGS. 6, 14, 15 and 16 illustrate in detail the guide disc 11. In particular, FIG. 14 is a front view, according to the direction of the rotation axis X, of the guide disc 11, FIG. 15 is a section according to the diametral plane along the line XV-XV in FIG. 14 and FIG. 16 is an enlargement of a portion of FIG. 15.

The guide disc 11 comprises one or more radial holes 23 that extend from a radially outer edge 11.3 up to the axial central seat 11.1. Two radial holes 23 are provided in the embodiment illustrated, but this must not be considered binding. The number and the angular position of the radial holes 23 can differ in different embodiments. As will be clear from the description below of operation of the constant velocity joint 100, the radial holes 23 allow passage of the lubricant from the annular seat 7 to the axial central seat 11.1 of the guide disc 11, in which the spherical heads 12 of the two outer yokes 103, 105 are received.

In FIGS. 14, 15 and 16, the annular grooves for mounting the gaskets 9 are indicated with 11.5.

The constant velocity joint 100 can be equipped with a safety guard, shown in particular in FIGS. 3 and 4 and omitted in FIGS. 1 and 2. This guard can comprise a cover 31, a ring 32 and shoes 33 that engage in a groove 26 provided on the central core 101 and in particular preferably on the body 101.2 opposite to the body that houses the reservoir 1.

Operation of the joint described above is as follows. Before putting the constant velocity joint 100 into operation, the reservoir 1 is filled with lubricant, typically a lubricating grease, through the grease nipple 2. The lubricant can be fed at a suitable pressure. The air present in the reservoir 1 can be vented from the valve 3 and/or from the calibrated hole 13 as the reservoir 1 fills with lubricant. During insertion through the grease nipple 2, the lubricant penetrates the feed chamber 5 and from this the storage chamber 1.1 through the opening or annular passage 22 (FIG. 6) formed between the body 101.1 and the radially inner edge 4.2 of the feed disc 4, so as to fill the whole of the volume available in the reservoir 1, i.e., both the storage chamber 1.1 and the feed chamber 5), with lubricant.

The operator can verify complete filling of the reservoir 1 by means of the valve 3, from which pressurized lubricant starts to exit when the reservoir 1 is full. At this point, the constant velocity joint 100 is ready to start operating.

During rotation of the constant velocity joint 100, the centrifugal force pushes the lubricant contained in the reservoir 1 toward the tangential zone thereof. Due to the presence of the inlet hole 15 and of the outlet hole 17, joined by the channel 16, the centrifugal force pushes the lubricant from the storage chamber 1.1 of the reservoir 1 to the feed chamber 5 through the feed disc 4. More in particular, the lubricant exits from the storage chamber 1.1 of the reservoir 1 through the inlet hole 15 of the feed disc 4 and enters the feed chamber 5 passing through the channel 16 and the outlet hole 17. The position of the inlet hole 15 and outlet hole 17 is such that as a result of the centrifugal force acting on the lubricant the feed chamber 5 is always full of lubricant. Any excess lubricant that passes from the storage chamber 1.1 to the feed chamber 5 returns to the storage chamber 1.1 of the reservoir 1 through the annular passage or opening 22. The O-ring 21 prevents the direct passage of lubricant from the storage chamber 1.1 of the reservoir 1 to the feed chamber 5. This obliges the lubricant, pushed by the centrifugal force, to pass through the path formed by the inlet hole 15, by the channel 16 and by the outlet hole 17.

As the feed chamber 5 is always maintained full, the mass of lubricant contained therein presses, as a result of the centrifugal force acting thereon, substantially always with the same force on the face 6.3 of the dosing disc 6, and in particular on the inlet hole 18 thereof. In this way, through the dosing disc 6, an approximately constant amount of lubricant is dosed toward the annular seat 7 of the constant velocity joint 100.

Dosing of the correct amount of lubricant per unit of time in the annular seat 7 of the central core 101 is achieved through the path defined by the inlet hole 18, by the slot 19 and by the outlet hole 20. The relative position of the inlet and outlet holes 18, 20, their diameters, and the thickness of the slot 19 are chosen so as to obtain the desired flow rate of lubricant in normal operating conditions (rotation speed) of the constant velocity joint 100. It is understood that the force with which the lubricant is pushed along the path 18, 19, 20 depends on the centrifugal force and hence on the angular velocity of the constant velocity joint 100. The aforesaid dimensions and positions of the holes 18, 20 and of the slot 19 are chosen so as to cause a pressure drop in the flow of lubricant and obtain a suitable flow rate of lubricant in all operating conditions.

This is facilitated in that the greater the angular velocity, the greater the need for lubrication, but also the greater the thrust generated by the centrifugal force and hence the flow rate of lubricant through the dosing disc 6. Moreover, in general the machines to which the constant velocity joint 100 in question is fitted operate at substantially steady-state rotational speed, for example around 1000 rpm, and the lubricant dosing system can be calibrated to dispense the optimal amount of lubricant at this steady-state speed.

The lubricant that is dispensed by the dosing disc 6 in the annular seat 7 passes through the radial holes 23 of the guide disc or satellite 11 and reaches the axial central seat 11.1 thereof, so as to lubricate the surface of the axial central seat 11.1 and the spherical heads 12.1, 12.2. These surfaces are in mutual contact and require lubrication during operation of the joint to prevent the guide disc 11 and spherical heads 12.1, 12.2 from seizing.

The lubricant that is dispensed by the dosing disc 6 in the annular seat 7 is pushed into the radial holes 23 as a result of the movement in radial direction of the guide disc 11 in the annular seat 7, for example passing from the position of FIG. 3 to the position of FIG. 4. This movement of the guide disc in a plane orthogonal to the rotation axis X of the central core 101 of the constant velocity joint 100 is a consequence of the variation of the mutual angular position of the shafts connected by the constant velocity joint 100 (angle α, FIG. 4). This angle varies repeatedly during operation of the constant velocity joint 100 and this ensures continuous injection of lubricant from the annular seat 7 into the axial central seat 11.1 through the holes 23.

To ensure regular operation of this lubrication process, one of the outer yokes 103, 105 can be provided with a hole 14 (FIGS. 3, 4, 5) that places the outside environment in communication with the volume delimited between the two spherical heads 12.1, 12.2 and the axial central seat 11.1. This volume varies when the angular position of the axes A, B of the shafts and of the grooved profiles 104, 106 varies. More in particular, when the guide disc or satellite 11 moves away from the rotation axis X of the joint (FIG. 4) the volume increases and lubricant is injected through the holes 23 from the annular seat 7 into the axial central seat 11.1. The opposite occurs when the guide disc 11 moves from a more peripheral position (FIG. 4) to a more central position (FIG. 3). The hole 14 prevents over-pressures or negative pressures from being generated in the lubrication volume between the spherical heads 12.1, 12.2 and the axial central seat 11.1.

Notwithstanding the presence of the gaskets described above, unavoidable leakages of lubricant occur during operation of the constant velocity joint 100 and therefore the amount of lubricant in the reservoir 1 decreases gradually. When the storage chamber 1.1 of the reservoir 1 is empty, the reservoir 1 is filled once again as described above.

With the described arrangement many advantages can be obtained. In particular, the supply of lubricant in the reservoir 1 ensures correct operation of the constant velocity joint 100 for many hours, reducing the frequency with which the constant velocity joint 100 requires to be filled with lubricant. It has been found that the topping up frequency of the lubricant can be reduced by 10 times or more with respect to the frequency in conventional constant velocity joints, where the lubricant is accumulated only in the annular seat 7. In this way, a substantial advantage is obtained in terms of management of the machines and reduction in maintenance times.

Moreover, the presence of suitable improved gaskets and lubricant dosing obtained by the dosing system described enables a substantial reduction in lubricant consumption, up to one fifth of the typical consumption of conventional joints. This is advantageous both from the viewpoint of operating costs and from the viewpoint of reduced environmental pollution.

What is claimed is:

1. A wide-angle constant velocity joint comprising:
   a first outer yoke and a second outer yoke;
   a first spider and a second spider hinged to the first outer yoke and to the second outer yoke, respectively;
   a central core, forming a first inner yoke and a second inner yoke, wherein said first inner yoke and said second inner yoke are connected through the first spider and the second spider to the first outer yoke and to the second outer yoke, respectively;
   a guide disc engaged in an annular seat formed in the central core and coaxial to a rotation axis of the central core, spherical heads of the first outer yoke and of the second outer yoke being engaged with said guide disc;
   a lubricant reservoir in the central core, in communication with said annular seat; and
   a dosing system for dosing the lubricant from the reservoir to the annular seat, wherein the dosing system comprises a dosing disc interposed between the reservoir and the annular seat; wherein the dosing disc comprises an inlet hole, an outlet hole and a slot extending in a thickness of the dosing disc and that places the inlet hole in communication with the outlet hole; and wherein the inlet hole and the outlet hole are spaced from each other in at least one of a tangential direction and a radial direction, so as to define a dispensing path of the lubricant along said slot from the inlet hole to the outlet hole.

2. The joint of claim 1, wherein: the central core comprises a first body and a second body, coupled to each other, between which the annular seat is defined; and the reservoir is formed in at least one of said first body and second body.

3. The joint of claim 1, wherein the reservoir has an annular extension around the rotation axis of the central core.

4. The joint of claim 1, wherein the reservoir has an annular extension around the rotation axis of the central core, and is positioned on one side of the annular seat.

5. The joint of claim 1, wherein the dosing system is configured to dose the lubricant as a result of the centrifugal force generated by rotation of the joint on the lubricant.

6. The joint of claim 1, wherein the reservoir comprises a grease nipple for feeding the lubricant into the reservoir, and a valve adapted to allow lubricant to exit from the reservoir when the reservoir is full.

7. The joint of claim 6, wherein: the reservoir is divided into a storage chamber and a feed chamber, the storage chamber being in communication with the feed chamber, and the feed chamber being in communication with the annular seat in which the guide disc is housed; and the grease nipple is in communication with the feed chamber and the valve is in communication with the storage chamber.

8. The joint of claim 1, wherein the reservoir is divided into a storage chamber and a feed chamber, the storage chamber being in communication with the feed chamber, and the feed chamber being in communication with the annular seat in which the guide disc is housed.

9. The joint of claim 8, wherein the storage chamber and the feed chamber are separated from one another by a feed disc, configured to maintain a level of lubricant in the feed chamber gradually transferring lubricant from the storage chamber to the feed chamber.

10. The joint of claim 9, wherein the feed disc comprises: an inlet hole, in communication with the storage chamber; an outlet hole, in communication with the feed chamber; and a connection channel between the inlet hole and the outlet hole; and wherein the inlet hole is at a greater distance than the outlet hole from the rotation axis of the central core.

11. The joint of claim 9, wherein: the feed disc has a radially outer edge and a radially inner edge; the radially outer edge defines a separation seal between the storage chamber and the feed chamber; and the radially inner edge defines a passage between the feed chamber and the storage chamber.

12. The joint of claim 1, wherein the guide disc has at least one radial hole that extends from a radially outer edge to an axial central seat, in which the spherical heads of the first outer yoke and of the second outer yoke engage.

13. The joint of claim 1, wherein at least one of the spherical heads is passed through by a hole that places the inside of the guide disc in communication with the outside environment.

14. The joint of claim 1, wherein the reservoir comprises a calibrated hole for the inflow of air from outside, adapted to allow the inflow of air to fill the volume left free by the lubricant that is dispensed from the reservoir toward the annular seat.

15. The joint of claim 1, wherein between the guide disc and the annular seat in which the guide disc is slidingly received, there are arranged elastic annular laminar bodies in sliding contact each with a respective substantially flat surface of the guide disc and a respective substantially flat surface of the annular seat.

16. The joint of claim 15, wherein between each face of each elastic annular laminar body and the corresponding surface of the guide disc and the corresponding surface of the annular seat there are arranged respective annular sealing gaskets.

17. A wide-angle constant velocity joint comprising:
a first outer yoke and a second outer yoke;
a first spider and a second spider hinged to the first outer yoke and to the second outer yoke, respectively;
a central core, forming a first inner yoke and a second inner yoke, wherein said first inner yoke and said second inner yoke are connected through the first spider and the second spider to the first outer yoke and to the second outer yoke, respectively;
a guide disc engaged in an annular seat formed in the central core and coaxial to a rotation axis of the central core, spherical heads of the first outer yoke and of the second outer yoke being engaged with said guide disc;
a lubricant reservoir in the central core, in communication with said annular seat; and
a dosing system for dosing the lubricant from the reservoir to the annular seat, wherein the reservoir is divided into a storage chamber and a feed chamber, the storage chamber being in communication with the feed chamber, and the feed chamber being in communication with the annular seat in which the guide disc is housed; and wherein the storage chamber and the feed chamber are separated from one another by a feed disc, configured to maintain a level of lubricant in the feed chamber gradually transferring lubricant from the storage chamber to the feed chamber.

18. The joint of claim 17, wherein the dosing system comprises a dosing disc interposed between the reservoir and the annular seat.

19. The joint of claim 18, wherein the dosing disc comprises an inlet hole, an outlet hole and a slot extending in the thickness of the dosing disc and that places the inlet hole in communication with the outlet hole; wherein the inlet hole and the outlet hole are spaced from each other in at least one of a tangential direction and a radial direction, so as to define a dispensing path of the lubricant along said slot from the inlet hole to the outlet hole.

20. The joint of claim 17, wherein the feed disc comprises: an inlet hole, in communication with the storage chamber; an outlet hole, in communication with the feed chamber; and a connection channel between the inlet hole and the outlet hole; and wherein the inlet hole is at a greater distance than the outlet hole from the rotation axis of the central core.

21. The joint of claim 17, wherein: the feed disc has a radially outer edge and a radially inner edge; the radially outer edge defines a separation seal between the storage chamber and the feed chamber; and the radially inner edge defines a passage, preferably annular, between the feed chamber and the storage chamber.

* * * * *